US011297473B2

(12) United States Patent
Nemec et al.

(10) Patent No.: US 11,297,473 B2
(45) Date of Patent: *Apr. 5, 2022

(54) EARLY BOARDING OF PASSENGERS IN AUTONOMOUS VEHICLES

(71) Applicant: Waymo LLC, Mountain View, CA (US)

(72) Inventors: Philip Nemec, San Jose, CA (US); Renaud-Roland Hubert, Gilroy, CA (US); Joshua Seth Herbach, San Francisco, CA (US); Min Li Chan, San Francisco, CA (US); Michael Epstein, Danville, CA (US); Salil Pandit, Palo Alto, CA (US); John Wesley Dyer, Los Altos, CA (US); Juliet Rothenberg, San Francisco, CA (US)

(73) Assignee: Waymo LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/073,433

(22) Filed: Oct. 19, 2020

(65) Prior Publication Data

US 2021/0092572 A1 Mar. 25, 2021

Related U.S. Application Data

(63) Continuation of application No. 16/554,810, filed on Aug. 29, 2019, now Pat. No. 10,848,938, which is a
(Continued)

(51) Int. Cl.
*G08B 21/00* (2006.01)
*H04W 4/40* (2018.01)
(Continued)

(52) U.S. Cl.
CPC ............ *H04W 4/40* (2018.02); *B60W 30/181* (2013.01); *G05D 1/0088* (2013.01); *G06Q 10/04* (2013.01);
(Continued)

(58) Field of Classification Search
CPC ........ H04W 4/40; H04W 12/06; G06Q 10/04; G06Q 10/047; G06Q 50/30; G05D 1/0088;
(Continued)

(56) References Cited

U.S. PATENT DOCUMENTS 6,356,838 B1 3/2002 Paul
6,414,635 B1 7/2002 Stewart et al.
(Continued)

OTHER PUBLICATIONS

Notice Of Preliminary Rejection In KR Patent Application No. 10-2019-7033165, dated Jan. 15, 2021, with English Translation, 13 pages.
(Continued)

*Primary Examiner* — Mark S Rushing
(74) *Attorney, Agent, or Firm* — Botos Churchill IP Law

(57) ABSTRACT

The technology relates to actively looking for an assigned passenger prior to a vehicle 100 reaching a pickup location. For instance, information identifying the pickup location and client device information for authenticating the assigned passenger is received. Sensor data is received from a perception system of the vehicle identifying objects in an environment of the vehicle. When the vehicle is within a predetermined distance from the pickup location, authenticating a client device using the client device information is attempted. When the client device has been authenticated, the sensor data is used to determine whether a pedestrian is within a first threshold distance of the vehicle. When a pedestrian is determined to be within the first threshold distance of the vehicle, the vehicle is stopped prior to
(Continued)

reaching the pickup location, to wait for the pedestrian within the first threshold distance of the vehicle to enter the vehicle.

20 Claims, 13 Drawing Sheets

Related U.S. Application Data continuation of application No. 15/854,211, filed on Dec. 26, 2017, now Pat. No. 10,440,536.

(60) Provisional application No. 62/577,856, filed on Oct. 27, 2017, provisional application No. 62/508,482, filed on May 19, 2017.

(51) Int. Cl.
| | |
|---|---|
| *G06Q 50/30* | (2012.01) |
| *G05D 1/00* | (2006.01) |
| *B60W 30/18* | (2012.01) |
| *G06Q 10/04* | (2012.01) |
| *H04W 12/06* | (2021.01) |

(52) U.S. Cl.
CPC ........... *G06Q 10/047* (2013.01); *G06Q 50/30* (2013.01); *B60W 2556/45* (2020.02); *G05D 2201/0212* (2013.01); *H04W 12/06* (2013.01)

(58) Field of Classification Search
CPC ........ G05D 2201/0212; B60W 30/181; B60W 2556/45; B60W 30/14; B60W 40/02; B60W 2520/04; B60W 2420/00; B60W 2554/00; B60Y 2400/30
USPC .......................................................... 340/994
See application file for complete search history.

(56) References Cited

U.S. PATENT DOCUMENTS

| | | |
|---|---|---|
| 6,545,601 B1 | 4/2003 | Monroe |
| 6,812,851 B1 | 11/2004 | Dukach et al. |
| 7,920,071 B2 | 4/2011 | Baillot |
| 8,346,426 B1 | 1/2013 | Szybalski et al. |
| 9,020,533 B1 | 4/2015 | Mangiardi et al. |
| 9,194,168 B1 | 11/2015 | Lu et al. |
| 9,429,947 B1 | 8/2016 | Wengreen |
| 9,436,180 B1 | 9/2016 | Fredinburg et al. |
| 9,547,307 B1 | 1/2017 | Cullinane et al. |
| 9,551,992 B1 | 1/2017 | Barton-Sweeney et al. |
| 9,733,096 B2 | 8/2017 | Colijn et al. |
| 9,910,438 B1 | 3/2018 | Arden et al. |
| 9,963,106 B1 | 5/2018 | Ricci |
| 2002/0028002 A1 | 3/2002 | Whited |
| 2002/0038181 A1 | 3/2002 | Okude et al. |
| 2002/0058517 A1 | 5/2002 | Furukawa et al. |
| 2002/0075201 A1 | 6/2002 | Sauer et al. |
| 2002/0183920 A1 | 12/2002 | Smith et al. |
| 2003/0125845 A1 | 7/2003 | Carlstedt et al. |
| 2003/0222794 A1 | 12/2003 | Vial |
| 2004/0076280 A1 | 4/2004 | Ando et al. |
| 2004/0102898 A1 | 5/2004 | Yokota et al. |
| 2004/0128065 A1 | 7/2004 | Taylor et al. |
| 2005/0018066 A1 | 1/2005 | Hofer |
| 2005/0104745 A1 | 5/2005 | Bachelder et al. |
| 2005/0114014 A1 | 5/2005 | Issac |
| 2005/0153707 A1 | 7/2005 | Ledyard et al. |
| 2005/0225636 A1 | 10/2005 | Maemura et al. |
| 2005/0231419 A1 | 10/2005 | Mitchell |
| 2007/0197231 A1 | 8/2007 | Lin |
| 2007/0279521 A1 | 12/2007 | Cohen |
| 2008/0225137 A1 | 9/2008 | Kubo et al. |
| 2008/0270204 A1 | 10/2008 | Poykko et al. |
| 2008/0275645 A1 | 11/2008 | Hoshino |
| 2009/0156241 A1 | 6/2009 | Staffaroni et al. |
| 2009/0192851 A1 | 7/2009 | Bishop |
| 2009/0234573 A1 | 9/2009 | Notarantonio |
| 2009/0326991 A1 | 12/2009 | Wei et al. |
| 2010/0194596 A1 | 8/2010 | Wang et al. |
| 2010/0217613 A1 | 8/2010 | Kelly |
| 2010/0228574 A1 | 9/2010 | Mundinger et al. |
| 2010/0241349 A1 | 9/2010 | Wu |
| 2010/0265048 A1 | 10/2010 | Lu et al. |
| 2010/0293030 A1 | 11/2010 | Wu |
| 2010/0332133 A1 | 12/2010 | Harris et al. |
| 2011/0050463 A1 | 3/2011 | Yu et al. |
| 2011/0053642 A1 | 3/2011 | Lee |
| 2011/0059693 A1 | 3/2011 | Osullivan |
| 2011/0068954 A1 | 3/2011 | McQuade et al. |
| 2011/0099040 A1 | 4/2011 | Felt et al. |
| 2011/0216200 A1 | 9/2011 | Chung et al. |
| 2011/0313594 A1 | 12/2011 | Kato et al. |
| 2011/0313880 A1 | 12/2011 | Paul et al. |
| 2012/0041675 A1 | 2/2012 | Juliver et al. |
| 2012/0109694 A1 | 5/2012 | Lee et al. |
| 2012/0130627 A1 | 5/2012 | Islam |
| 2012/0154591 A1 | 6/2012 | Baur et al. |
| 2012/0191269 A1 | 7/2012 | Chen et al. |
| 2012/0277952 A1 | 11/2012 | MacNeille |
| 2013/0046456 A1 | 2/2013 | Scofield et al. |
| 2013/0061044 A1 | 3/2013 | Pinkus et al. |
| 2013/0144660 A1 | 6/2013 | Martin |
| 2013/0149998 A1 | 6/2013 | Yi et al. |
| 2013/0204463 A1 | 8/2013 | Chiappetta |
| 2013/0211916 A1 | 8/2013 | Putman |
| 2013/0218647 A1 | 8/2013 | Kroll et al. |
| 2013/0286206 A1 | 10/2013 | Ozaki et al. |
| 2013/0289858 A1 | 10/2013 | Mangiat et al. |
| 2014/0051465 A1 | 2/2014 | Ruys et al. |
| 2014/0172727 A1 | 6/2014 | Abhyanker et al. |
| 2014/0200739 A1 | 7/2014 | Kirsch |
| 2014/0300449 A1 | 10/2014 | Kounavis |
| 2014/0365250 A1 | 12/2014 | Ikeda et al. |
| 2015/0032328 A1 | 1/2015 | Healey et al. |
| 2015/0081362 A1 | 3/2015 | Chadwick et al. |
| 2015/0142484 A1 | 5/2015 | Huang et al. |
| 2015/0154810 A1 | 6/2015 | Tew et al. |
| 2015/0161554 A1 | 6/2015 | Sweeney et al. |
| 2015/0175072 A1 | 6/2015 | Sabeti |
| 2015/0199619 A1 | 7/2015 | Ichinose et al. |
| 2015/0220791 A1 | 8/2015 | Wu et al. |
| 2015/0302342 A1 | 10/2015 | Yeh |
| 2015/0337587 A1 | 11/2015 | Lu et al. |
| 2015/0338849 A1 | 11/2015 | Nemec et al. |
| 2015/0339923 A1 | 11/2015 | König et al. |
| 2015/0346727 A1 | 12/2015 | Ramanujam |
| 2016/0021154 A1 | 1/2016 | Schoeffler |
| 2016/0161266 A1 | 6/2016 | Crawford et al. |
| 2016/0167653 A1 | 6/2016 | Malone et al. |
| 2016/0261604 A1 | 9/2016 | Pal et al. |
| 2017/0153714 A1 | 6/2017 | Gao et al. |
| 2017/0286884 A1 | 10/2017 | Shoval et al. |

OTHER PUBLICATIONS

"International Search Report and Written Opinion received for PCT Patent Application No. PCT/US2018/031780, dated Jul. 16, 2018", 15 pages.

Bose, et al., "Autonomously Controlled Storage Management in Vehicle Logistics—Applications of RFID and Mobile Computing Systems", International Journal of RF Technologies: Research and Applications, iFirst Article, 2008, pp. 1-20.

Brownell, Christopher Kirlin, "Shared Autonomous Taxi Networks: An Analysis of Transportation Demand in NJ and a 21st Century Solution for Congestion", Submitted in partial fulfillment of the requirements for the degree of Bachelor of Science and Engineering, Princeton University, Apr. 15, 2013, 122 pages.

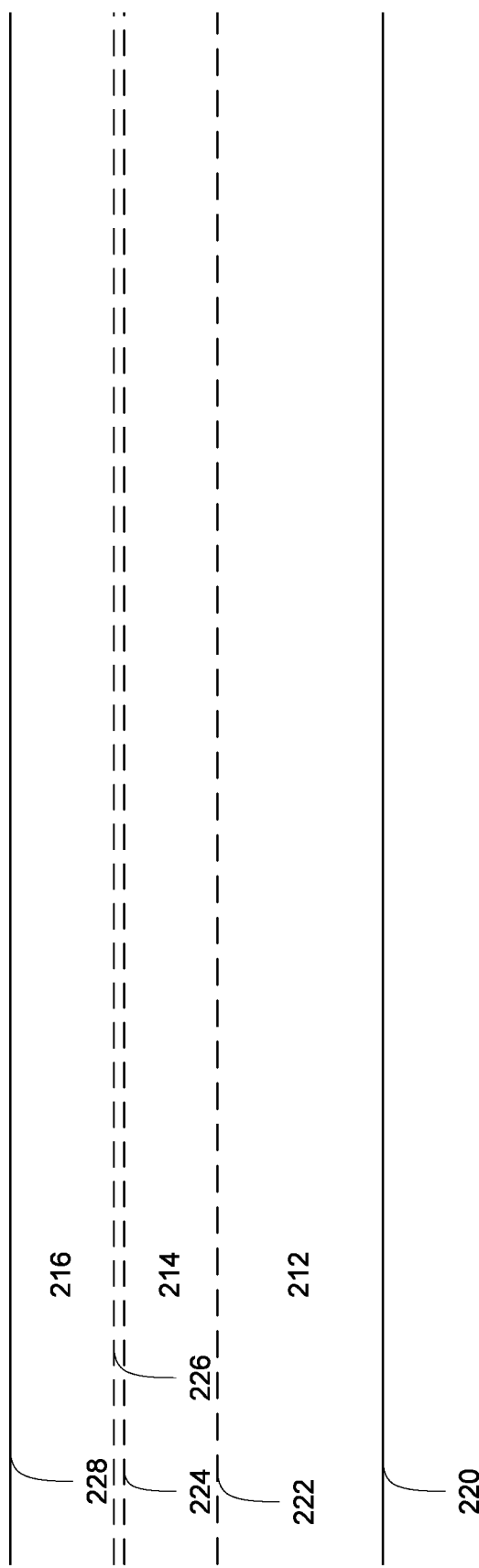

EARLY BOARDING OF PASSENGERS IN AUTONOMOUS VEHICLES

CROSS-REFERENCES TO RELATED APPLICATIONS

The present application is a continuation of U.S. patent application Ser. No. 16/554,810, filed Aug. 29, 2019, which is a continuation of U.S. patent application Ser. No. 15/854,211, filed Dec. 26, 2017, issue as U.S. Pat. No. 10,440,536, which claims the benefit of the filing date of both U.S. Provisional Application No. 62/508,482, filed May 19, 2017, and U.S. Provisional Application No. 62/577,856, filed Oct. 27, 2017, the disclosures of which are hereby incorporated herein by reference.

BACKGROUND

Autonomous vehicles, such as vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location.

When a person (or user) wants to be physically transported between two locations via a vehicle, they may use any number of transportation services. To date, these services typically involve a human driver who is given dispatch instructions to a location to pick up the user. In many cases, the human driver and the user are able to arrange an exact location for the user to be picked up. In addition, drivers and users are able to "flag down" one another, use eye contact, speak to one another, or other signals to indicate recognition of one another and thereby agree to some location prior to the vehicle reaching the exact location for the pickup. This is not readily achievable in the case of autonomous vehicles which do not have a human driver.

BRIEF SUMMARY

One aspect of the disclosure provides a method of actively looking for an assigned passenger prior to a vehicle reaching a pickup location. The method includes receiving, by one or more processors, information identifying the pickup location and client device information for authenticating the assigned passenger; receiving, by the one or more processors, sensor data from a perception system of the vehicle identifying objects in an environment of the vehicle; when the vehicle is within a predetermined distance of the pickup location, attempting, by the one or more processors, to authenticate a client device using the client device information; when the client device has been authenticated, using, by the one or more processors, the sensor data to determine whether a pedestrian is within a first threshold distance of the vehicle; when a pedestrian is determined to be within the first threshold distance of the vehicle, stopping, by the one or more processors, the vehicle prior to reaching the pickup location to wait for the pedestrian within the first threshold distance of the vehicle to enter the vehicle; and after the pedestrian enters the vehicle, maneuvering, by the one or more processors, the vehicle to a destination with the pedestrian as an occupant of the vehicle.

In one example, the method also includes identifying a first ring around the vehicle corresponding to the first threshold distance; identifying a second ring around the vehicle corresponding to a second threshold distance, by shrinking the first ring to a size of the second ring after a predetermined period of time; using the sensor data to determine whether a pedestrian is within the second threshold distance of the vehicle; and when a pedestrian is determined to be within the second threshold distance of the vehicle and while stopped, continuing to wait for the pedestrian within the first threshold distance of the vehicle to enter the vehicle. In another example, the method also includes, when a pedestrian is determined not to be within the second threshold distance of the vehicle, moving the vehicle towards the pickup location without a passenger. In another example, the method also includes reducing a size of the first threshold distance to one or more smaller threshold distances; determining that there is no pedestrian within the one or more smaller threshold distances; after reducing the size of the first threshold distance to one or more smaller threshold distances and determining that there is no pedestrian within the one or more smaller threshold distance, using the sensor data to determine whether the pedestrian or a different pedestrian is within the first threshold distance of the vehicle; and after using the sensor data to determine whether the pedestrian or a different pedestrian is within the first threshold distance of the vehicle, when the pedestrian or a different pedestrian is determined to be within the first threshold distance, stopping the vehicle again to wait for the pedestrian or a different pedestrian within the first threshold distance of the vehicle to enter the vehicle. In this example, using the sensor data to determine the pedestrian or a different pedestrian is within the first threshold distance of the vehicle is performed only after the vehicle has traveled a minimum distance since initially using the sensor data to determine whether a pedestrian is within a first threshold distance of the vehicle. In another example, using the sensor data to determine whether a pedestrian is within a first threshold distance of the vehicle is performed only when the vehicle is stopped or traveling below a predetermined maximum speed limit. In another example, using the sensor data to determine whether a pedestrian is within a first threshold distance of the vehicle is performed only when the vehicle is in a particular lane of a roadway. In another example, using the sensor data to determine whether a pedestrian is within a first threshold distance of the vehicle is performed only when the vehicle is traveling on a roadway that meets a particular maximum speed limit. In another example, the method also includes, prior to stopping the vehicle, determining that it is not currently safe to stop the vehicle, and continuing towards the pickup location. In this example, the method also includes providing a notification at the vehicle that an early boarding attempt is not possible. In another example, stopping the vehicle includes stopping the vehicle in a current lane of the vehicle.

Another aspect of the disclosure provides a system for actively looking for an assigned passenger prior to a vehicle reaching a pickup location, the system comprising one or more processors. The one or more processors are configured to receive information identifying a pickup location and client device information for authenticating the assigned passenger; receive sensor data from a perception system of the vehicle identifying objects in an environment of the vehicle; when the vehicle is within a predetermined distance of the pickup location, attempt to authenticate a client device using the client device information; when the client device has been authenticated, use the sensor data to determine whether a pedestrian is within a first threshold distance of the vehicle; when a pedestrian is determined to be within the first threshold distance of the vehicle, stop the vehicle prior to reaching the pickup location to wait for the pedestrian within the first threshold distance of the vehicle to enter the vehicle; and after the pedestrian enters the vehicle, maneuver the vehicle to a destination with the pedestrian as an occupant of the vehicle.

In one example, the one or more processors are further configured to identify a first ring around the vehicle corresponding to the first threshold distance; identify a second ring around the vehicle corresponding to a second threshold distance, by shrinking the first ring to a size of the second ring after a predetermined period of time; use the sensor data to determine whether a pedestrian is within the second threshold distance of the vehicle; and when a pedestrian is determined to be within the second threshold distance of the vehicle and while stopped, continue to wait for the pedestrian within the first threshold distance of the vehicle to enter the vehicle. In this example, the one or more processors are further configured to, when a pedestrian is determined not to be within the second threshold distance of the vehicle, move the vehicle towards the pickup location without a passenger. In another example, the one or more processors are further configured to reduce a size of the first threshold distance to one or more smaller threshold distances; determine that there is no pedestrian within the one or more smaller threshold distances; after reducing the size of the first threshold distance to one or more smaller threshold distances and determining that there is no pedestrian within the one or more smaller threshold distance, use the sensor data to determine whether the pedestrian or a different pedestrian is within the first threshold distance of the vehicle; and after using the sensor data to determine whether the pedestrian or a different pedestrian is within the first threshold distance of the vehicle, when the pedestrian or a different pedestrian is determined to be within the first threshold distance, stop the vehicle again to wait for the pedestrian or a different pedestrian within the first threshold distance of the vehicle to enter the vehicle. In this example, the one or more processors are configured to use the sensor data to determine the pedestrian or a different pedestrian is within the first threshold distance of the vehicle only after the vehicle has traveled a minimum distance since initially using the sensor data to determine whether a pedestrian is within a first threshold distance of the vehicle. In another example, the one or more processors are configured to use the sensor data to determine whether a pedestrian is within a first threshold distance of the vehicle only when the vehicle is stopped or traveling within a predetermined maximum speed limit. In another example, the one or more processors are configured to use the sensor data to determine whether a pedestrian is within a first threshold distance of the vehicle is performed only when the vehicle is in a particular lane of a roadway. In another example, the one or more processors are configured to use the sensor data to determine whether a pedestrian is within a first threshold distance of the vehicle only when the vehicle is traveling on a roadway that meets a particular maximum speed limit. In another example, the system also includes the vehicle.

BRIEF DESCRIPTION OF THE DRAWINGS

FIG. 2 is an example representation of detailed map information in accordance with aspects of the disclosure.

DETAILED DESCRIPTION

Overview

Figure 1:
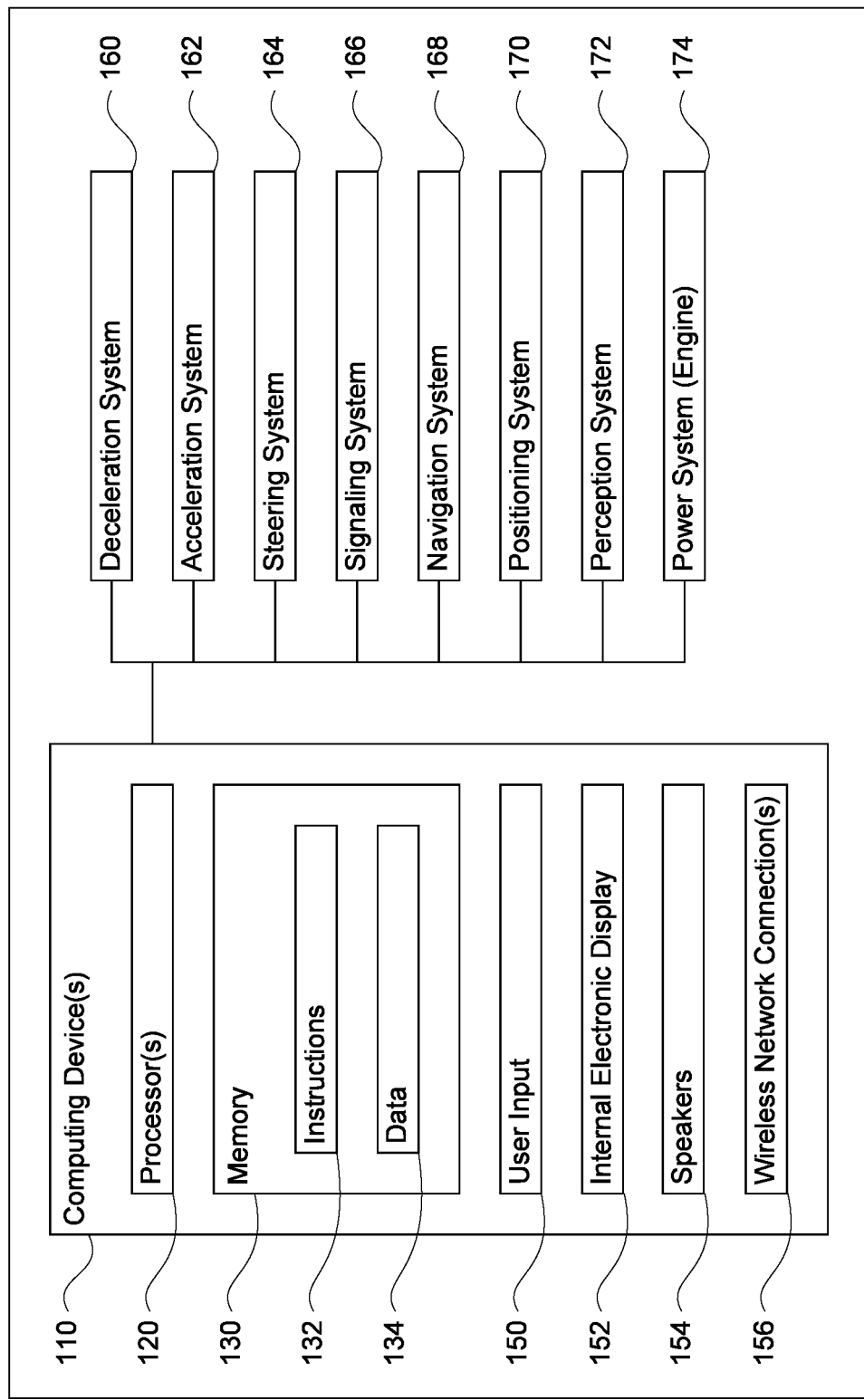
FIG. 1 is a functional diagram of an example vehicle in accordance with aspects of the disclosure.
Figure 3A:
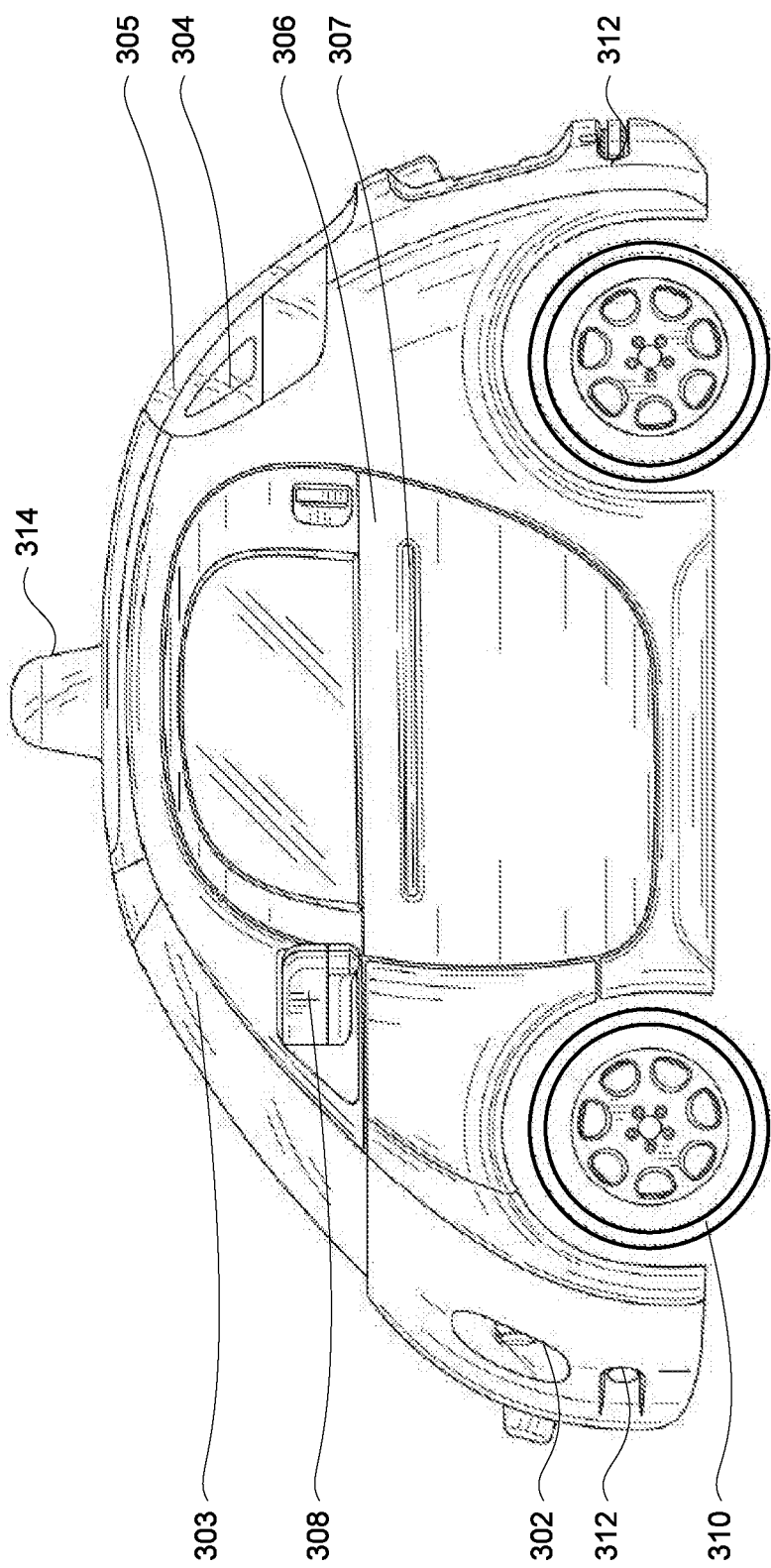
FIGS. 3A-3D are example external views of a vehicle in accordance with aspects of the disclosure.
Figure 3C:
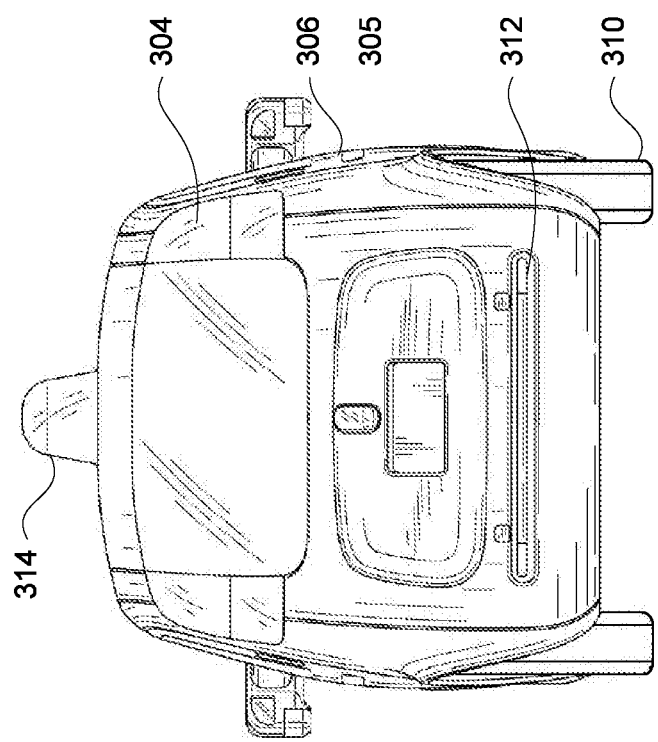
Figure 3B:
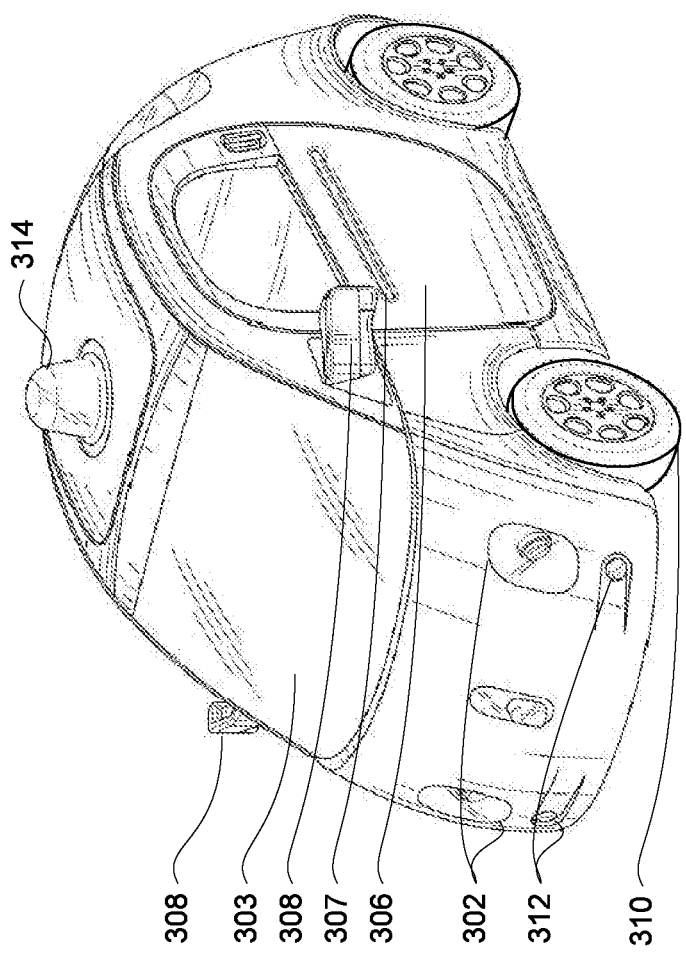
Figure 3D:
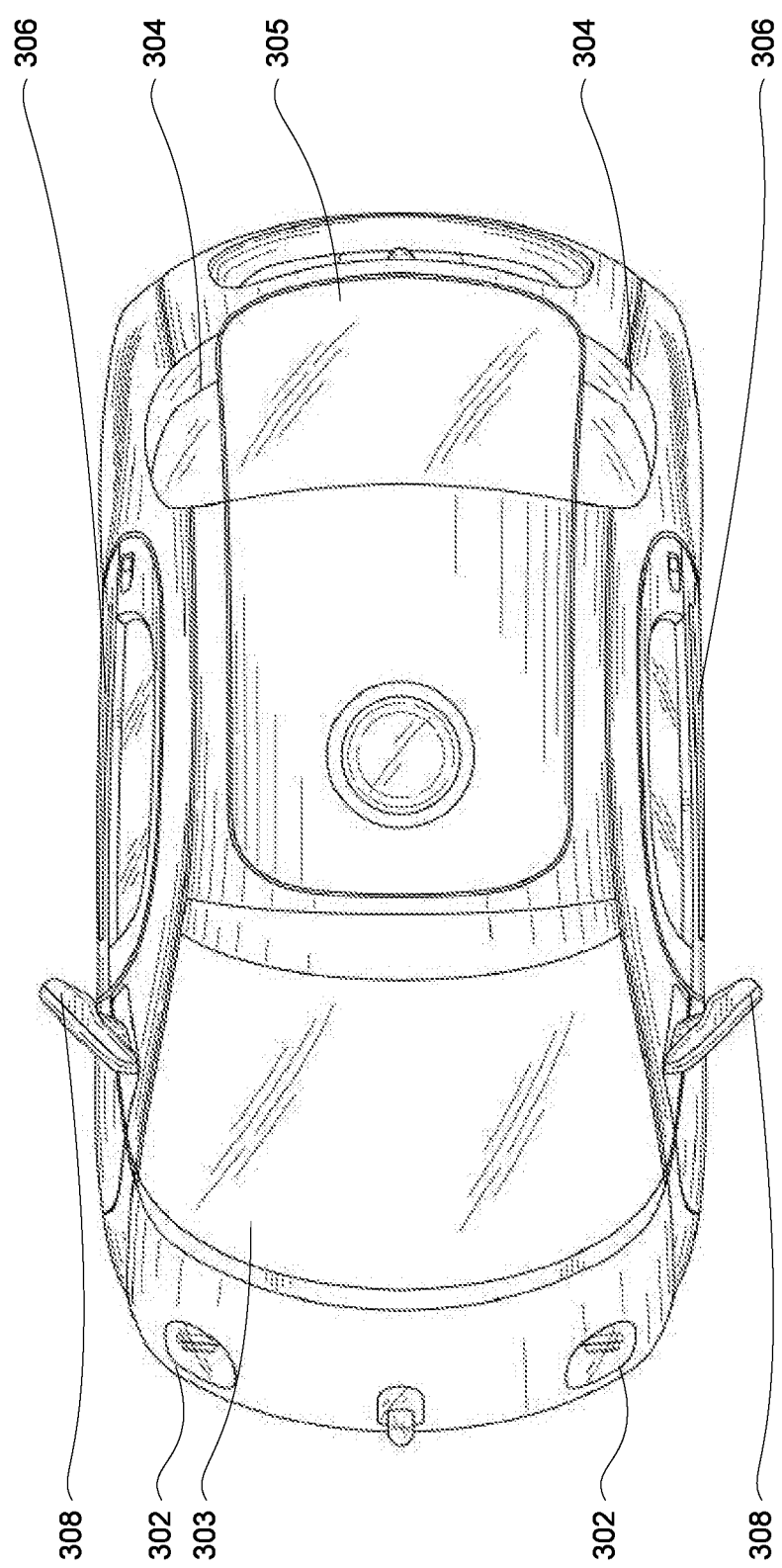

Aspects of the technology relate to picking up passengers in vehicles that do not have a human driver, for instance, autonomous vehicles. This can be challenging due to changing environmental conditions, the absence of a human driver, and uncertainty as to how long a vehicle may have to wait (or is able to wait) for the passenger. In addition, a person who recognizes that a particular vehicle may be approaching a predetermined pickup location to pick up the person, may want to enter the vehicle as soon as possible, rather than waiting for both the vehicle and the person to reach the pickup location. In another example, a person is waiting on the side of the road and observes the vehicle slowing down or coming to stop (e.g., to avoid or yield to another object) for a reason other than initiating the pickup. In these cases, the person may believe the vehicle has stopped for him or her and walk towards the vehicle, whereas in reality, the vehicle is intending to continue towards the pickup location and allow the person to enter the vehicle at that location. This, in turn, may cause the vehicle to slow down or yield for the person and further make it unlikely for the car to proceed to the pullover spot. This can frustrate users who are now unclear as to where or whether to enter the car, and can also disrupt traffic around the vehicle which may not begin moving.

To facilitate a faster connection between the vehicle and a person (or passenger) who is waiting for (or assigned to) that vehicle in order to travel to a destination, the vehicle's computing devices may operate the vehicle in order to actively look for that person in order to facilitate an early boarding. This active looking logic may begin once the vehicle is within a predetermined distance in time or space from the pickup location, such as some amount of time or distance before or after the vehicle's computing devices should begin looking for a place to stop and/or park the vehicle, once the passenger and/or the passenger's client devices has been authenticated by the vehicle, or a combination of both. In addition or alternatively, initiation of the logic may be tied to a set of predetermined requirements. For instance, the computing devices may only initiate the logic once all or a subset of the requirements has been met.

At the same time, the vehicle's perception system may identify objects from sensor data collected from the vehicle's environment as people and/or pedestrians. The perception system may provide this information to the vehicle's computing devices. Once the predetermined distance has been reached, the computing devices, in turn, may begin looking for a pedestrian within a short distance of the vehicle who may be plausibly approaching the vehicle, and hence be the passenger assigned to a vehicle. In other words, the computing devices may use the information from the perception system to look for a pedestrian within a first predetermined distance of the vehicle corresponding to a walking distance in time.

If no such pedestrians are found or identified, the vehicle may continue to the pickup location. Alternatively, if or when a pedestrian is identified within the predetermined distance of the vehicle, the vehicle may come to a full stop (if not already), unlock one or more doors of the vehicle, and allow the pedestrian to enter or board the vehicle at that location. Once boarding is complete, rather than continuing to the pickup location, the computing devices may simply begin routing the vehicle to the destination. Of course, stopping the vehicle at any time or location must be balanced with safety concerns.

Returning to the logic, after a predetermined period of time, and the computing devices will begin to look for a pedestrian or determine if the same pedestrian is within a second, smaller predetermined distance of the vehicle. In other words, the ring begins to shrink. Again, if no such pedestrians are found or identified within the second predetermined distance, the vehicle may no longer wait (i.e. start moving again) and continue to the pickup location. If there is a pedestrian within the second predetermined distance, a third predetermined distance may be used, and so on until a last predetermined distance is met depending upon the size of the initial distance and how long a pedestrian at the average speed would expect to reach the vehicle.

In this regard, the computing devices are able to look for and identify a pedestrian that is actively making progress towards boarding the vehicle. Using the rings guarantee this progress by checking proximity to the vehicle at ever decreasing distances. Of course, other mechanisms besides the shrinking rings can be used to estimate whether the passenger is attempting to board.

In cases where a pedestrian was inside the ring but does not move toward the vehicle quickly enough to stay within the ring as it shrinks or stay within a smaller ring (if a series of thresholds are used), when the vehicle continues to the pickup location, the predetermined distance may be reset to the first predetermined distance. This would essentially give the pedestrian, who may or may not be assigned to the vehicle, another chance to reach the vehicle. Of course, to avoid the vehicle constantly stopping, the predetermined distance may be reset only after the vehicle has reached at least a minimum distance from where the vehicle first stopped.

The features described herein allow a vehicle without a driver to enable a passenger to board the vehicle early (before the vehicle reaches a pickup location) in an effective and reasonably safe way. By actively looking for potential passengers, the computing devices are able to allow passengers to enter the vehicles as quickly as possible thereby increasing the efficiency of the transportation system. This, in turn, reduces the likelihood of confusion for a passenger attempting to enter the vehicle and allows the passenger to feel as if he or she is interacting with the vehicle as if he or she were interacting with a human driver.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, busses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. As an example, data 134 of memory 130 may store predefined scenarios. A given scenario may identify a set of scenario requirements including a type of object, a range of locations of the object relative to the vehicle, as well as other factors such as whether the autonomous vehicle is able to maneuver around the object, whether the object is using a turn signal, the condition of a traffic light relevant to the current location of the object, whether the object is approaching a stop sign, etc. The requirements may include discrete values, such as "right turn signal is on" or "in a right turn only lane", or ranges of values such as "having an heading that is oriented at an angle that is 30 to 60 degrees offset from a current path of vehicle 100." In some examples, the predetermined scenarios may include similar information for multiple objects.

The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. As an example, internal electronic display 152 may be controlled by a dedicated computing device having its own processor or central processing unit (CPU), memory, etc. which may interface with the computing device 110 via a high-bandwidth or other network connection. In some examples, this computing device may be a user interface computing device which can communicate with a user's client device. Similarly, the memory may be a hard drive or other storage media located in a housing different from that of computing device 110. Accordingly, references to a processor or computing device will be understood to include references to a collection of processors or computing devices or memories that may or may not operate in parallel.

Computing device 110 may all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing device 110 to provide information to passengers within the vehicle 100. In addition to internal speakers, the one or more speakers 154 may include external speakers that are arranged at various locations on the vehicle in order to provide audible notifications to objects external to the vehicle 100.

In one example, computing device 110 may be an autonomous driving computing system incorporated into vehicle 100. The autonomous driving computing system may capable of communicating with various components of the vehicle. For example, returning to FIG. 1, computing device 110 may be in communication with various systems of vehicle 100, such as deceleration system 160 (for controlling braking of the vehicle), acceleration system 162 (for controlling acceleration of the vehicle), steering system 164 (for controlling the orientation of the wheels and direction of the vehicle), signaling system 166 (for controlling turn signals), navigation system 168 (for navigating the vehicle to a location or around objects), positioning system 170 (for determining the position of the vehicle), perception system 172 (for detecting objects in the vehicle's environment), and power system 174 (for example, a battery and/or gas or diesel powered engine) in order to control the movement, speed, etc. of vehicle 100 in accordance with the instructions 134 of memory 130 in an autonomous driving mode which does not require or need continuous or periodic input from a passenger of the vehicle. Again, although these systems are shown as external to computing device 110, in actuality, these systems may also be incorporated into computing device 110, again as an autonomous driving computing system for controlling vehicle 100.

The computing device 110 may control the direction and speed of the vehicle by controlling various components. By way of example, computing device 110 may navigate the vehicle to a destination location completely autonomously using data from the map information and navigation system 168. Computer 110 may use the positioning system 170 to determine the vehicle's location and perception system 172 to detect and respond to objects when needed to reach the location safely. In order to do so, computer 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between an engine of the vehicle and the wheels of the vehicle. Again, by controlling these systems, computer 110 may also control the drivetrain of the vehicle in order to maneuver the vehicle autonomously.

As an example, computing device 110 may interact with deceleration system 160 and acceleration system 162 in order to control the speed of the vehicle. Similarly, steering system 164 may be used by computing device 110 in order to control the direction of vehicle 100. For example, if vehicle 100 configured for use on a road, such as a car or truck, the steering system may include components to control the angle of wheels to turn the vehicle. Signaling system 166 may be used by computing device 110 in order to signal the vehicle's intent to other drivers or vehicles, for example, by lighting turn signals or brake lights when needed.

Navigation system 168 may be used by computing device 110 in order to determine and follow a route to a location. In this regard, the navigation system 168 and/or data 132 may store map information, e.g., highly detailed maps that computing devices 110 can use to navigate or control the vehicle. As an example, these maps may identify the shape and elevation of roadways, lane markers, intersections, crosswalks, speed limits, traffic signal lights, buildings, signs, real time traffic information, vegetation, or other such objects and information. The lane markers may include features such as solid or broken double or single lane lines, solid or broken lane lines, reflectors, etc. A given lane may be associated with left and right lane lines or other lane markers that define the boundary of the lane. Thus, most lanes may be bounded by a left edge of one lane line and a right edge of another lane line.

The perception system 172 also includes one or more components for detecting objects external to the vehicle such as other vehicles, obstacles in the roadway, traffic signals, signs, trees, etc. For example, the perception system 172 may include one or more LIDAR sensors, sonar devices, radar units, cameras and/or any other detection devices that record data which may be processed by computing devices 110. The sensors of the perception system may detect objects and their characteristics such as location, orientation, size, shape, type (for instance, vehicle, pedestrian, bicyclist, etc.), heading, and speed of movement, etc. The raw data from the sensors and/or the aforementioned characteristics can be quantified or arranged into a descriptive function, vector, and or bounding box and sent for further processing to the computing devices 110 periodically and continuously as it is generated by the perception system 172. As discussed in further detail below, computing devices 110 may use the positioning system 170 to determine the vehicle's location and perception system 172 to detect and respond to objects when needed to reach the location safely.

FIG. 2 is an example of map information 200 for a section of roadway 210. The map information 200 includes information identifying the shape, location, and other characteristics of various road features. In this example, roadway 210 includes three lanes 212, 214, 216 bounded by curb 220, lane lines 222, 224, 226, and curb 228. Lanes 212 and 214 have the same direction of traffic flow (in an eastward direction), while lane 216 has a different traffic flow (in a westward direction). In addition, lane 212 is significantly wider than lane 214, for instance to allow for vehicles to park adjacent to curb 220. Although the example of map information includes only a few road features, for instance, curbs, lane lines, and lanes, given the nature of roadway 210, the map information 200 may also identify various other road features such as traffic signal lights, crosswalks, sidewalks, stop signs, yield signs, speed limit signs, road signs, etc. Although not shown, the detailed map information may also include information identifying speed limits and other legal traffic requirements as well as historical information identifying typical and historical traffic conditions at various dates and times.

Although the detailed map information is depicted herein as an image-based map, the map information need not be entirely image based (for example, raster). For example, the detailed map information may include one or more roadgraphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

FIGS. 3A-3D are examples of external views of vehicle 100. As can be seen, vehicle 100 includes many features of a typical vehicle such as headlights 302, windshield 303, taillights/turn signal lights 304, rear windshield 305, doors 306, side view mirrors 308, tires and wheels 310, and turn signal/parking lights 312. Headlights 302, taillights/turn signal lights 304, and turn signal/parking lights 312 may be associated the signaling system 166. Light bar 307 may also be associated with the signaling system 166. Housing 314 may house one or more sensors, such as LIDAR sensors, sonar devices, radar units, cameras, etc. of the perception system 172, though such sensors may also be incorporated into other areas of the vehicle as well.

Figure 4:
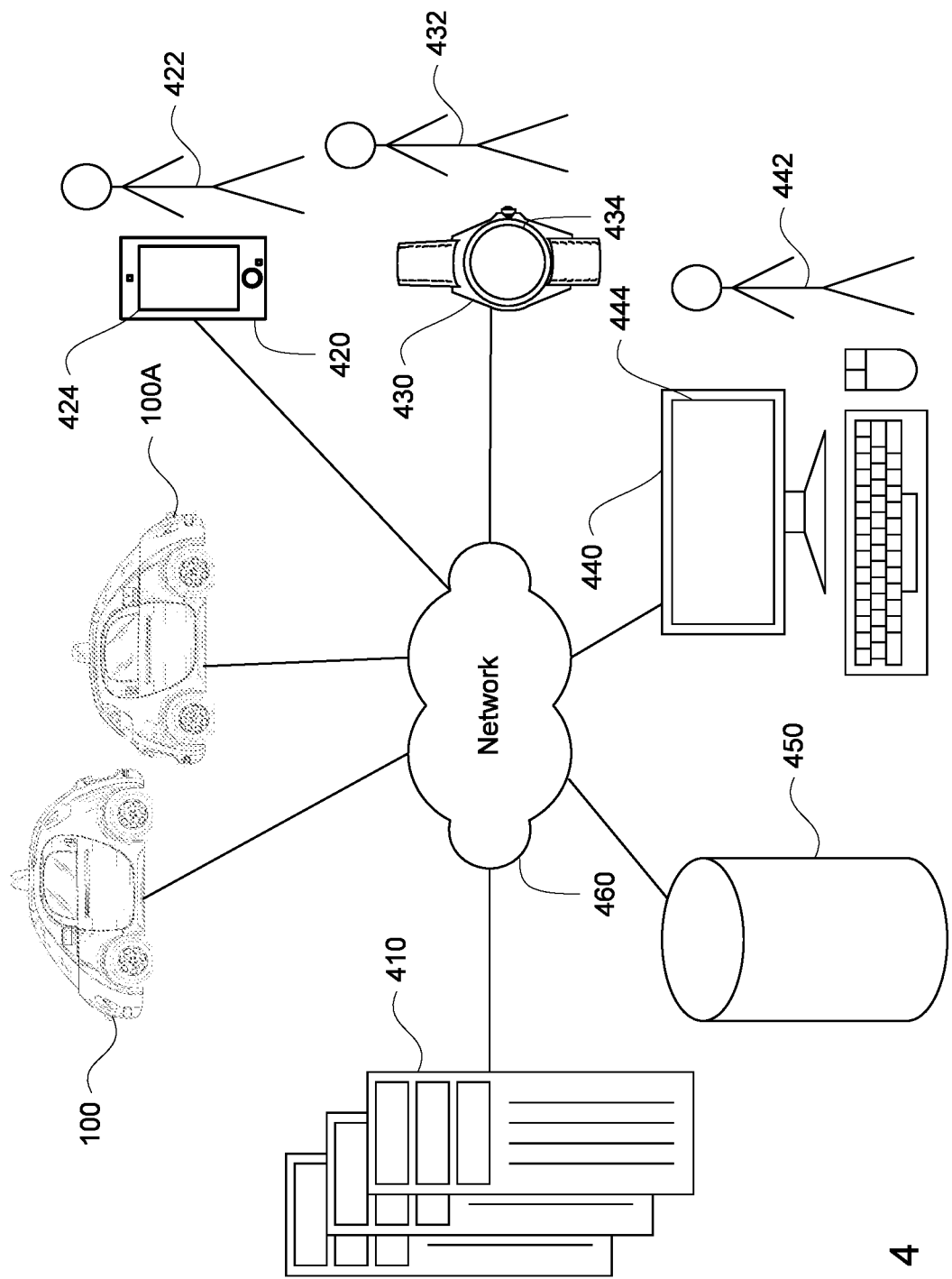
FIG. 4 is an example pictorial diagram of a system in accordance with aspects of the disclosure.
Figure 5:
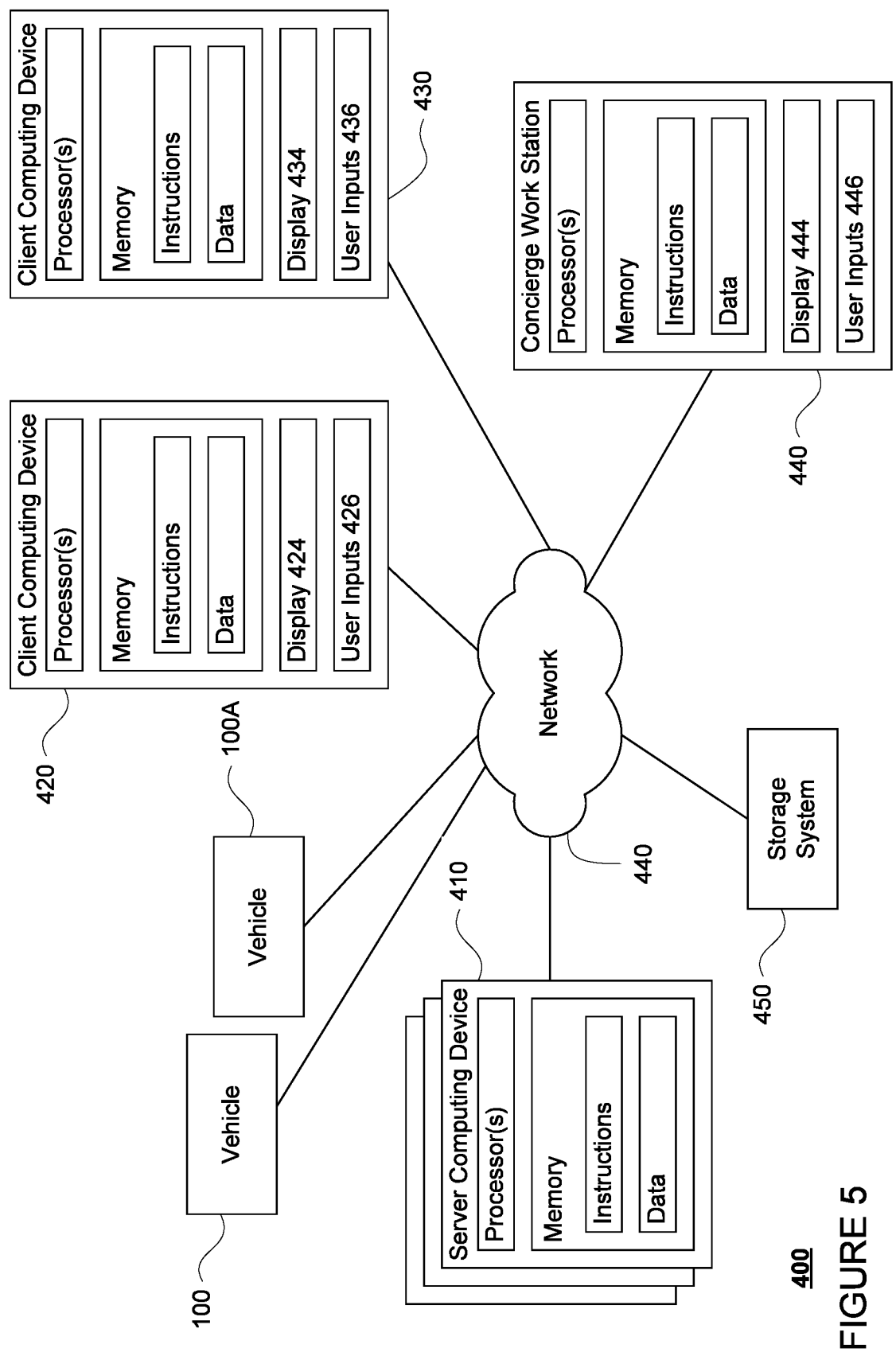
FIG. 5 is an example functional diagram of a system in accordance with aspects of the disclosure.

The one or more computing devices 110 of vehicle 100 may also receive or transfer information to and from other computing devices, for instance using wireless network connections 156. The wireless network connections may include, for instance, BLUETOOTH®, Bluetooth LE, LTE, cellular, near field communications, etc. and various combinations of the foregoing. FIGS. 4 and 5 are pictorial and functional diagrams, respectively, of an example system 400 that includes a plurality of computing devices 410, 420, 430, 440 and a storage system 450 connected via a network 460. System 400 also includes vehicle 100, and vehicle 100A which may be configured similarly to vehicle 100. Although only a few vehicles and computing devices are depicted for simplicity, a typical system may include significantly more.

As shown in FIG. 4, each of computing devices 410, 420, 430, 440 may include one or more processors, memory, data and instructions. Such processors, memories, data and instructions may be configured similarly to one or more processors 120, memory 130, data 132, and instructions 134 of computing device 110.

The network 460, and intervening nodes, may include various configurations and protocols including short range communication protocols such as BLUETOOTH®, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 110 may include a server having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with one or more computing devices 110 of vehicle 100 or a similar computing device of vehicle 100A as well as client computing devices 420, 430, 440 via the network 460. For example, vehicles 100 and 100A may be a part of a fleet of vehicles that can be dispatched by server computing devices to various locations. In this regard, the vehicles of the fleet may periodically send the server computing devices location information provided by the vehicle's respective positioning systems and the one or more server computing devices may track the locations of the vehicles.

In addition, server computing devices 410 may use network 460 to transmit and present information to a user, such as user 422, 432, 442 on a display, such as displays 424, 434, 444 of computing devices 420, 430, 440. In this regard, computing devices 420, 430, 440 may be considered client computing devices.

As shown in FIG. 5, each client computing device 420, 430, 440 may be a personal computing device intended for use by a user 422, 432, 442, and have all of the components normally used in connection with a personal computing device including a one or more processors (e.g., a central processing unit (CPU)), memory (e.g., RAM and internal hard drives) storing data and instructions, a display such as displays 424, 434, 444 (e.g., a monitor having a screen, a touch-screen, a projector, a television, or other device that is operable to display information), and user input devices 426, 436, 446 (e.g., a mouse, keyboard, touchscreen or microphone). The client computing devices may also include a camera for recording video streams, speakers, a network interface device, and all of the components used for connecting these elements to one another.

Although the client computing devices 420, 430, and 440 may each comprise a full-sized personal computing device, they may alternatively comprise mobile computing devices capable of wirelessly exchanging data with a server over a network such as the Internet. By way of example only, client computing device 420 may be a mobile phone or a device such as a wireless-enabled PDA, a tablet PC, a wearable computing device or system, or a netbook that is capable of obtaining information via the Internet or other networks. In another example, client computing device 430 may be a wearable computing system, shown as a head-mounted computing system in FIG. 5. As an example the user may input information using a small keyboard, a keypad, microphone, using visual signals with a camera, or a touch screen.

In some examples, client computing device 440 may be concierge work station used by an administrator to provide concierge services to users such as users 422 and 432. For example, a concierge 442 may use the concierge work station 440 to communicate via a telephone call or audio connection with users through their respective client computing devices or vehicles 100 or 100A in order to ensure the safe operation of vehicles 100 and 100A and the safety of the users as described in further detail below. Although only a single concierge work station 440 is shown in FIGS. 4 and 5, any number of such work stations may be included in a typical system.

Storage system 450 may store various types of information as described in more detail below. This information may be retrieved or otherwise accessed by a server computing device, such as one or more server computing devices 410, in order to perform some or all of the features described herein. For example, the information may include user account information such as credentials (e.g., a user name and password as in the case of a traditional single-factor authentication as well as other types of credentials typically used in multi-factor authentications such as random identifiers, biometrics, etc.) that can be used to identify a user to the one or more server computing devices. The user account information may also include personal information such as the user's name, contact information, identifying information of the user's client computing device (or devices if multiple devices are used with the same user account), as well as one or more unique signals for the user.

The storage system 450 may also store routing data for generating and evaluating routes between locations. For example, the routing information may be used to estimate how long it would take a vehicle at a first location to reach a second location. In this regard, the routing information may include map information, not necessarily as particular as the detailed map information described above, but including roads, as well as information about those road such as direction (one way, two way, etc.), orientation (North, South, etc.), speed limits, as well as traffic information identifying expected traffic conditions, etc.

The storage system 150 may also store information which can be provided to client computing devices for display to a user. For instance, the storage system 150 may store predetermined distance information for determining an area at which a vehicle is likely to stop for a given pickup or destination location. The storage system 150 may also store graphics, icons, and other items which may be displayed to a user as discussed below.

As with memory 130, storage system 250 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIG. 4 and/or may be directly connected to or incorporated into any of the computing devices 110, 410, 420, 430, 440, etc.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

In one aspect, a user may download an application for requesting a vehicle to a client computing device. For example, users 422 and 432 may download the application via a link in an email, directly from a website, or an application store to client computing devices 420 and 430. For example, client computing device may transmit a request for the application over the network, for example, to one or more server computing devices 110, and in response, receive the application. The application may be installed locally at the client computing device.

The user may then use his or her client computing device to access the application and request a vehicle. As an example, a user such as user 432 may use client computing device 130 to send a request to one or more server computing devices 110 for a vehicle. As part of this, the user may identify a pickup location, a destination location, and, in some cases, one or more intermediate stopping locations anywhere within a service area where a vehicle can stop.

These pickup and destination locations may be predefined (e.g., specific areas of a parking lot, etc.) or may simply be any location within a service area of the vehicles. As an example, a pickup location can be defaulted to the current location of the user's client computing device, or can be input by the user at the user's client device. For instance, the user may enter an address or other location information or select a location on a map to select a pickup location. Once the user has selected one or more of a pickup and/or destination locations, the client computing device 420 may send the location or locations to one or more server computing devices of the centralized dispatching system. In response, one or more server computing devices, such as server computing device 110, may select a vehicle, for instance based on availability and proximity to the user. The server computing device may then dispatch the selected vehicle to pick up to the user by providing the vehicle with the pickup and/or destination locations specified by the user.

Figure 6:
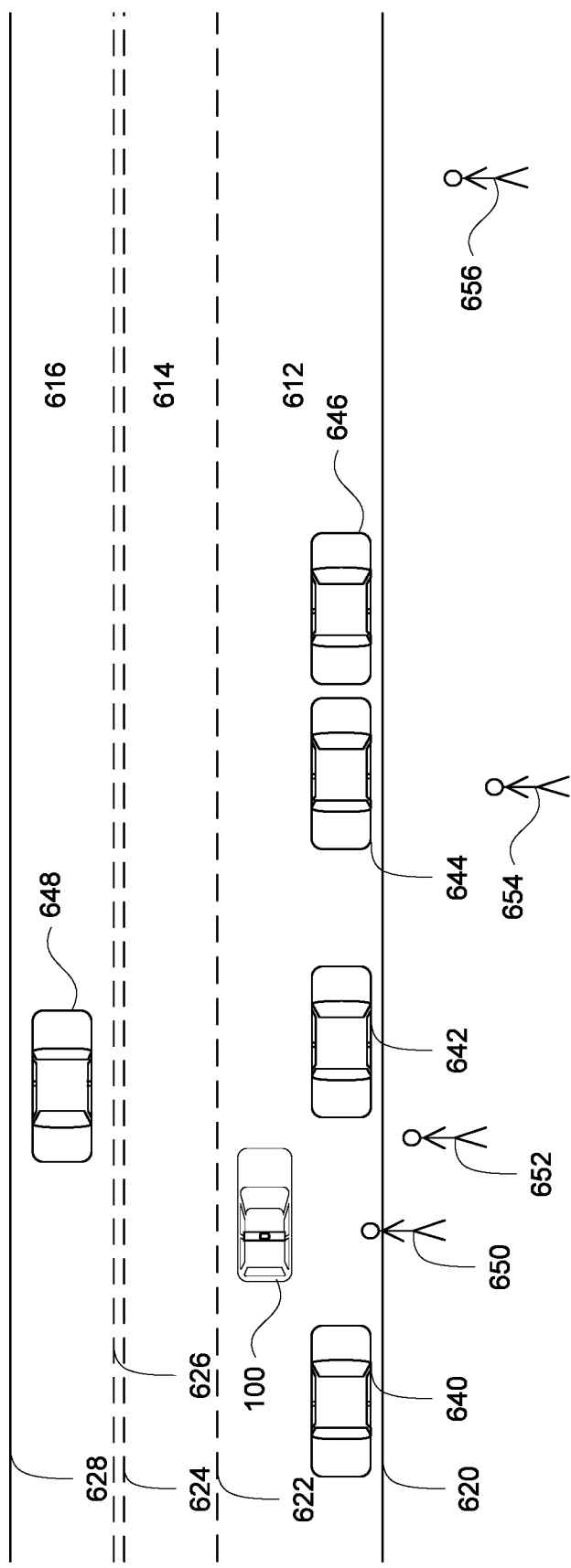
FIG. 6 is a view of a section of roadway in accordance with aspects of the disclosure.

FIG. 6 is an example view of vehicle 100 driving along a roadway 610 corresponding to roadway 210 of FIG. 2. In that regard, lanes 612, 614, 616 correspond to the shape and location of lanes 212, 214, 216, curbs 620, 628 correspond to the shape and location of curb 220, and lane lines 622, 624, 626 correspond to the shape and location of lane lines 222, 224, 226, and curb 228. In this example, vehicle 110 is traveling in lane 612. Vehicles 640, 642, 644, and 646 are parked within lane 612 along curb 620, while vehicle 648 is moving in lane 616. Pedestrians 650, 652, 654, 656 are located around roadway 210, but within the range of the sensors of the perception system 172.

Figure 7:
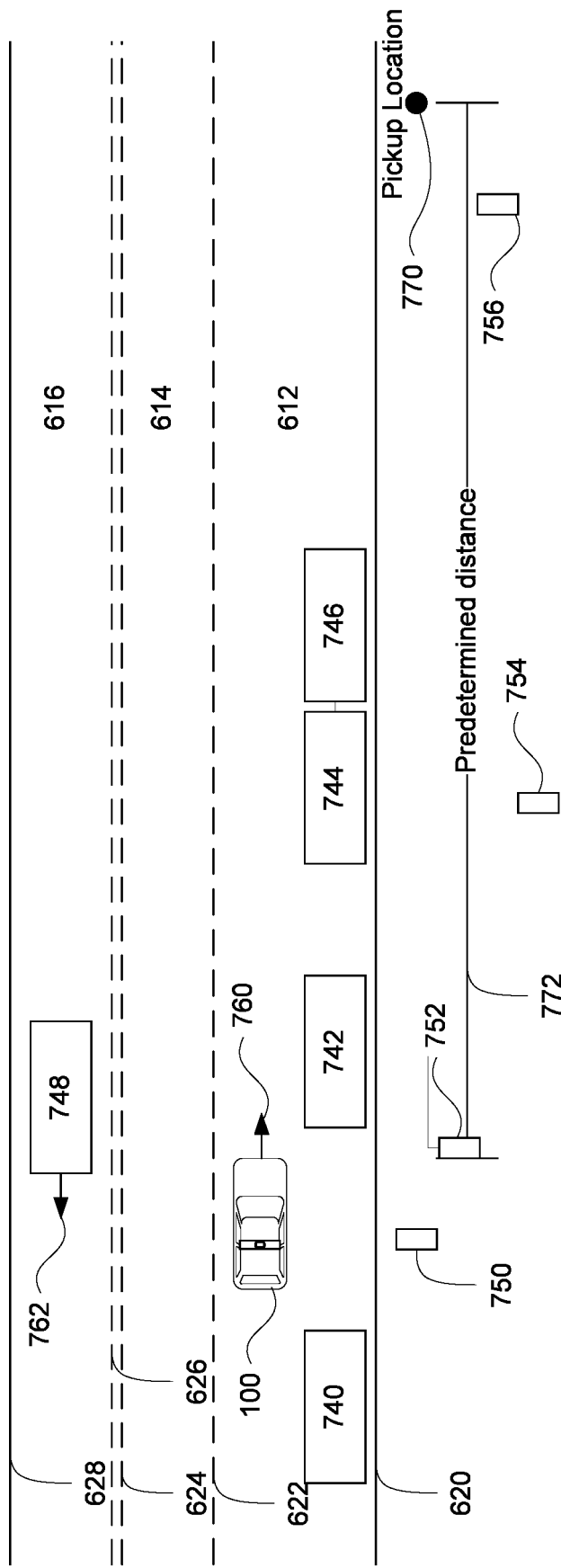
FIG. 7 is an example of sensor data for the section of roadway and other information in accordance with aspects of the disclosure.

As the vehicle moves along lane 612, the perception system 172 provides the computing devices with sensor data regarding the shapes and location of objects, such as curbs 620, 628, lane lines 622, 624, 624, as well as vehicles 640, 642, 644, 646, 648. FIG. 7 depicts sensor data perceived by the various sensors of the perception system 172 when vehicle 100 is in the situation as depicted in FIG. 6 in combination with other information available to the computing devices 110. In this example, vehicles 640, 642, 644, 646, 648 are represented by bounding boxes 740, 742, 744, 746, 748 as provided by the perception system 172 to the computing devices 110. Pedestrians 650, 652, 654, 656 are also represented by bounding boxes 750, 752, 754, 756, of course the boundaries of objects such as pedestrians. Of course, these bounding boxes represent merely a volume of space within which data points corresponding to an object are at least approximately bounded within. In addition, the actual heading of vehicle 100 and estimated heading of bounding box 748 are represented by arrows 760 and 762, respectively. As bounding boxes 740, 742, 744, 746 appear to be moving very slowly or not at all, the computing devices 110 may determine that the objects represented by these bounding boxes are parked along curb 620.

As noted above, to facilitate a faster connection between the vehicle and a person (or passenger) who is waiting for (or assigned to) that vehicle in order to travel to a destination, the vehicle's computing devices may operate the vehicle in order to actively look for that person in order to facilitate an early boarding. This active looking logic may begin once the vehicle is within a predetermined distance in time or space from the pickup location, once the passenger or the passenger's client device have been authenticated by the computing devices 110, or a combination of both. For example, this predetermined distance may be sometime before or after the vehicle's computing devices should begin looking for a place to stop and/or park the vehicle. As an example, this predetermined distance may be 50 meters, 50 feet, or more or less from the pickup location. For instance, as shown in FIG. 7, vehicle 100 has just reached a predetermined distance (represented by distance bar 772) from the pickup location (represented by marker 770). Once the vehicle is within the predetermined distance of the pickup location, using near-field communication, BLUETOOTH® or other wireless protocols, the computing devices 110 may attempt to communicate and establish a link with the passenger's client computing device, such as client computing device 420. When this link is successfully established, the client device can be authenticated.

Authentication of a pedestrian may include, for instance, using one or more of facial recognition, gait detection, pose detection, trajectory information, etc. to determine whether or not a pedestrian in the vehicle's environment is or is likely to be the assigned passenger. Facial recognition or gait detection may be achieved either by building data overtime, for instance by capturing images or video of the assigned passenger by perception systems of various vehicles over different trips or set up by the assigned passenger providing images or video as part of the application described above. The computing devices 110 may use sensor data from the perception system 172, which may include one or more cameras, to match the pedestrian with the facial data or gait data for the assigned passenger. Such information may be received by the computing devices 110 by the dispatching server computing devices 410. In addition or alternatively, the computing devices may use information about whether a pedestrian appears to be looking at or oriented towards (pose) the vehicle, for instance using a gaze detection model (i.e. one that is not specific to any given assigned passenger), to confirm or eliminate a pedestrian as being the assigned passenger. Similarly, by observing changes in position and orientation of a pedestrian over time, the computing devices may use information about a pedestrian's trajectory to determine whether the pedestrian's trajectory corresponds to a pedestrian attempting to move towards the vehicle, whether the pedestrian's trajectory corresponds to an expected trajectory from a nearby building (for instance a building corresponding to an address for a pickup location) to a pickup location, whether the pedestrian's trajectory corresponds to an expected trajectory from a nearby building to a location proximate to the pickup location where the vehicle is likely to stop (for instance, a shoulder area or parking area), whether the pedestrian's trajectory indicates that the pedestrian is moving towards a pickup location, and so on. Any of these trajectory determinations may indicate that the pedestrian is attempting to reach the vehicle. Thus, for each of these approaches, the computing devices 110 may determine whether the pedestrian approaching the vehicle 100 is more or less likely to be the assigned passenger or another person.

In addition or alternatively, initiation of the logic may be tied to a set of predetermined requirements. For instance, the computing devices may only initiate the logic once all or a subset of the following requirements has been met:

The vehicle is within the predetermined distance from the pickup location and/or a predetermined distance of the passenger assigned to the vehicle, for instance where the vehicle's computing devices receive GPS information from the person's client device.

The computing devices have successfully authenticated the assigned passenger and/or the assigned passenger's client device as in any of the examples discussed above.

The vehicle has come to a full stop or is traveling at a very low rate of speed, such as 3 mph or more or less, or a speed close to a walking speed of a pedestrian.

The vehicle is not currently located in a no stopping or blocking zone (such as for an intersection, railroad crossing, and/or as per traffic regulations or signs for the area).

The vehicle is traveling in a lane suitable for pulling over (for instance, a right most lane for a right hand drive country, a left most lane for a left hand drive country, or a lane adjacent to the edge of the roadway for lanes where stopping is reasonable on either side, such as one-way streets) or not located on a public roadway (e.g. in a parking lot or private road). Of course, if appropriate to drop passengers in certain areas not in the right (or left) most lane this may also be taken into consideration.

The vehicle is currently on a road which would be considered acceptable for picking up a passenger (in view of safety of the passenger, the vehicle, and other road users), such as those with a particular speed limit, for instance, less than 35 miles per hour, or more or less. Higher speed roads may be acceptable if there is a parking lane. In this regard, higher speed roads without parking lanes may not be acceptable.

The vehicle is not in the middle of a complex maneuver, such as a multi-point turn.

The vehicle is not currently following routing instructions from a remote operator or dispatching system that require the vehicle not to stop until the vehicle reaches the destination.

The computing devices have not otherwise received instructions to pick up the user at a location other than the pickup spot. For instance, if the computing devices are already attempting a "fly-by pickup", or a pickup of a passenger that is achieved prior to when the vehicle reaches a predetermined pickup area for the vehicle to pick up the passenger. Fly-by pickups may be initiated by the passenger, for instance by physically signaling to the vehicle or using the client computing device to request the fly-by pickup. Similarly, fly-by pickups may be initiated by the vehicle if the passenger's reported location indicates that the passenger is already waiting at a particular spot such as by a curb and therefore likely ready to go. In this example, the vehicle would be attempting to stop at that location and the logic would not be needed. Alternatively, the vehicle may ask the user if he or she is interested in a fly-by-pick-up in real time, for instance by displaying a popup notification with options for the user to select to accept or deny the request to do the fly-by pickup. In some examples, the fly-by pickup notification can be made using visual representations of the relationship between the vehicle and the location of the passenger's client computing device displayed at the vehicle or the passenger's client computing device. As such, a fly-by pickup may be result of last minute change to the pickup location or area for the passenger in view of a better or alternative pickup location or area for the vehicle, the passenger, or both.

The computing devices are not already too close in time or distance from reaching the destination, for instance where the computing devices are already attempting a maneuver to pull over in order to stop and wait for the passenger. Of course, if the stopping maneuver will take some additional amount of time to park parallel to a curb, it may simply be faster or more convenient to allow the vehicle to stop at an angle and allow the passenger to enter the vehicle.

Again, prior to initiating the logic, the computing devices may determine that one or more of the aforementioned requirements. This may also include determining whether specific subsets and/or combinations of the requirements have been met.

Figure 8:
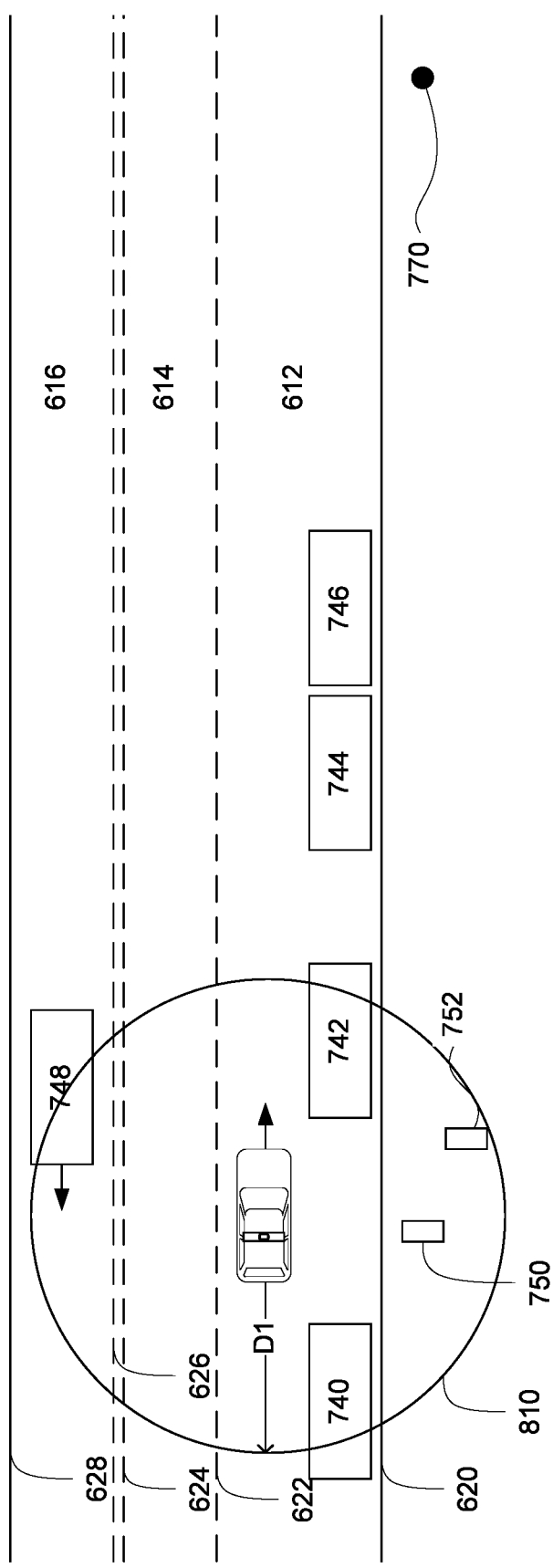
FIG. 8 is another example of sensor data for the section of roadway and other information in accordance with aspects of the disclosure.
Figure 9:
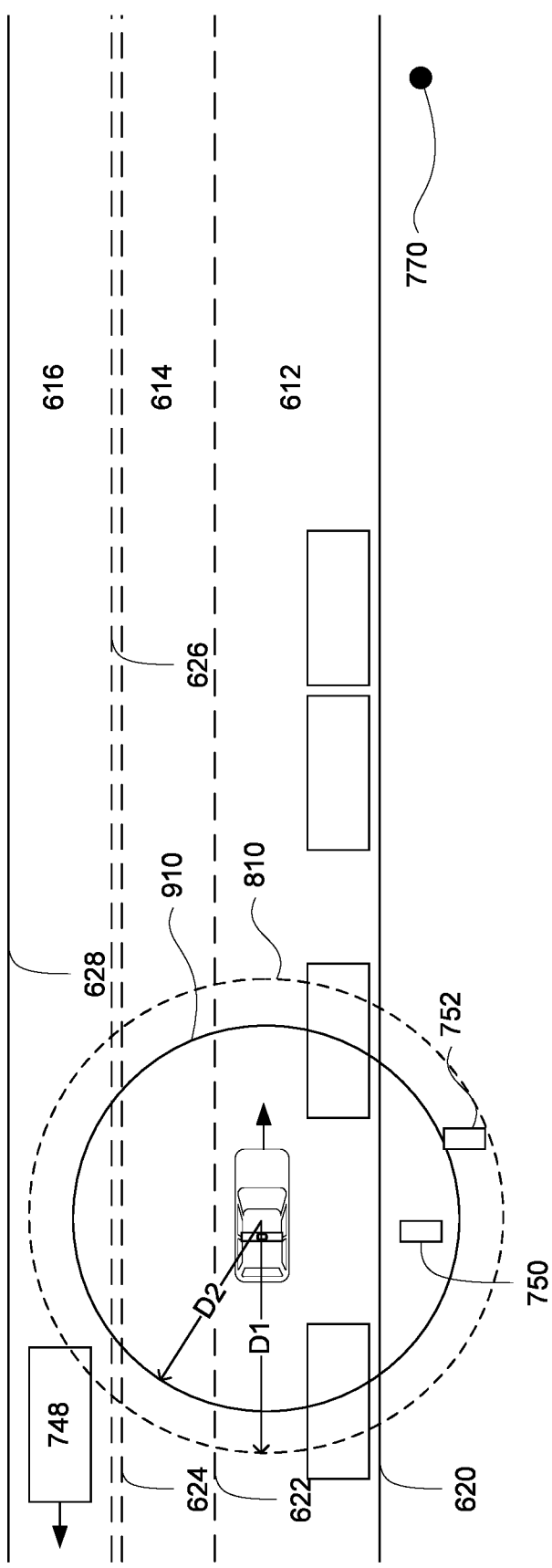
FIG. 9 is another example of sensor data for the section of roadway and other information in accordance with aspects of the disclosure.

As noted above, at the same time, the vehicle's perception system may identify objects from sensor data collected from the vehicle's environment as people and/or pedestrians. The perception system may provide this information to the vehicle's computing devices. Once the predetermined distance has been reached and any other necessary requirements have been met, the computing devices 110, may begin looking for a pedestrian within a short distance of the vehicle who may be plausibly approaching the vehicle 100, and hence be the passenger assigned to a vehicle. In other words, the computing devices 110 may use the information from the perception system 172 to look for a pedestrian within a first predetermined distance of the vehicle corresponding to a walking distance in time. As shown in FIG. 8, this area is depicted as a ring 810. As an example, the computing devices 110 may look for any pedestrians that are within a 5 second, or more or less, walking distance in time from the vehicle. This walking distance may be determined using an average, estimated or otherwise selected walking speed for a hypothetical pedestrian. For instance, assuming it would take a person walking at an average speed of 3 meters per second to reach the vehicle in 5 seconds, the radius D1 of the ring 810 may be 15 meters. This walking distance in time, here 5 seconds, may be selected based on an amount of time the vehicle can reasonably stop and wait without causing concern in terms of increasing the time for the vehicle to reach a pickup location or contributing to traffic issues.

If no such pedestrians are found or identified, the vehicle may continue to the pickup location. Alternatively, if or when one or more pedestrians are identified within the predetermined distance of the vehicle, the vehicle may come to a full stop (if not already), unlock one or more doors of the vehicle, and allow the pedestrian to enter or board the vehicle at that location. Returning to FIG. 8, the computing devices may identify two pedestrians corresponding to bounding boxes 750 and 752 as being within ring 810. Accordingly, the computing devices 110 may stop the vehicle within lane 612, as shown in FIG. 8, and wait for one or both of these pedestrians to early board or enter the vehicle. As noted above, computing devices may also unlock the vehicle's doors in order to facilitate the entry. Once boarding is completed, rather than continuing to the pickup location, the computing devices may simply begin routing the vehicle to the destination.

Of course, stopping the vehicle at any time or location must be balanced with safety concerns. For example, the computing device may override the stop such as when the vehicle is on or proximate to railroad tracks, an emergency vehicle is identified in the area (for instance, because sirens and/or flashing emergency lights are detected by the perception system), there are a number of other moving vehicles in the area, the vehicle is not currently in the correct lane for stopping (left lane instead of right, etc.), the vehicle is attempting a particular maneuver (a multi-point turn or turning at an intersection), whether the vehicle is in a no stopping zone, or there is some other obstacle making a stop undesirable. In addition, the computing devices may determine whether the pickup location would simply be a better place to stop or is very close by (i.e. it would be better to stop and pull over into a parking area, than to stop in a lane). When such is the case, the computing devices may of course continue to the pickup location, but at the same time send (if there is a link between the computing devices and the client device), display or sound a message to the pedestrian indicating that the vehicle will not stop. While also possible, displaying such information on the client device will be less useful as it is more likely that the pedestrian will be paying attention to the vehicle than the client device at this point.

Figure 10:
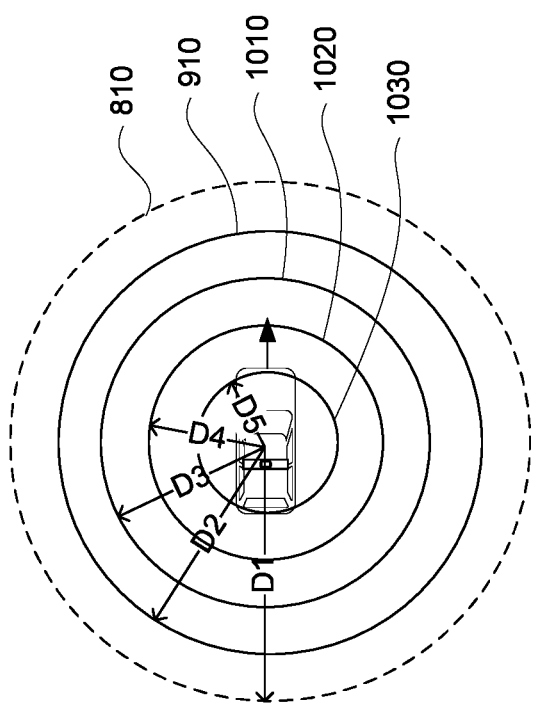
FIG. 10 is an example diagram of data in accordance with aspects of the disclosure.

Returning to the logic, while stopped and waiting for a pedestrian to enter the vehicle, after a predetermined period of time, the computing devices will begin to look for a pedestrian (or determine if the same or a different pedestrian is) within a second, smaller predetermined distance of the vehicle. This shrinking can be a "continuous" function which reduces or shrinks the size of the ring over time or simply replaces a ring with a smaller ring at discrete distances after a predetermined period of time has been reached. In other words, the ring 810 begins to shrink. FIG. 10 depicts the shrinking of ring 810 from D1 to D2 of ring 910 after 1 second or a second threshold corresponding to D2 of ring 910 after 1 second. As can be seen, the bounding boxes 750 and 752 remain within ring 810, but only the bounding box 750 is within ring 910. As such, the computing devices 110 may continue to wait for the pedestrian of bounding box 750 to enter the vehicle.

Again, if no such pedestrians are found or identified within the ring as it shrinks or within the second predetermined distance if the ring is replaced with a smaller ring, the vehicle may no longer wait (i.e. start moving again) and continue to the pickup location. If there is a pedestrian that remains within the ring as it continues to shrink or is within the second predetermined distance, the ring may further shrink or a third predetermined distance may be used, and so on until the ring reaches the vehicle or a last predetermined distance is met depending upon the size of the initial distance and walking speed used. For instance, FIG. 10 depicts a series of rings 810, 910, 1010, 1020, 1030 each at distances D1, D2, D3, D4, and D5 from the vehicle 100. Each distance is essentially a threshold distance corresponds to an area in which the computing devices would expect a pedestrian to be within after a predetermined period of time if the pedestrian was progressing towards the vehicle after being identified within ring 810. In this example, D2 represents a threshold distance after 1 second, D3 represents a threshold distance after 2 seconds, D4 represents a threshold distance after 4 seconds, and D5 represents a threshold distance after 5 seconds or presumably when the pedestrian would have entered the vehicle. Again, these rings may be considered discrete thresholds for different periods of or points in time or rather different positions of ring 810 as it shrinks down towards vehicle 100 over time. Thus, this shrinking corresponds to the walking speed discussed above in order to mimic the movement of a hypothetical pedestrian who would be walking towards the vehicle in order to gain entry.

In this regard, the computing devices are able to look for and identify a pedestrian that is actively making progress towards boarding the vehicle. Using the rings guarantee this progress by checking proximity to the vehicle at ever decreasing distances. Of course, other mechanisms besides the shrinking rings can be used to estimate whether the passenger is attempting to board.

In some examples, the computing devices may "invalidate" or otherwise ignore a particular pedestrian who continuously appears within the predetermined distances, but does not actually attempt to enter the vehicle. This may occur where a pedestrian happens to walking down a sidewalk alongside the vehicle, is actually walking away from the vehicle, or not really making enough progress towards the vehicle in order to indicate that the pedestrian actually wants to board. This invalidation may also occur based on other signals which may suggest the intent of the pedestrian, such as by gaze detection (is the pedestrian looking towards the vehicle), facial recognition or gait detection (if the computing devices have comparative data for the passenger assigned to the vehicle), GPS location from the client device (i.e. if the user appears to be several hundred meters or feet away), odds are the pedestrian is not the passenger assigned to the vehicle, whether information from the client device indicates that the passenger assigned to the vehicle is moving as compared to the observed pedestrian (change in GPS coordinates or accelerometer or gyroscope information), pose detection, trajectory information, whether the pedestrian is using arms or hands to gesture towards the vehicle, holding up a device with a specific color (for instance displaying a particular predetermined color on the device for recognition by the vehicle's computing devices), and so on. In other words, one or more of these approaches may be used to narrow down the set of pedestrians and identify the assigned passenger if there are more than one pedestrian who appear to be actively making progress towards boarding the vehicle as discussed above.

In cases where a pedestrian was inside the ring but does not move toward the vehicle quickly enough to stay within the ring as it shrinks or stay within a smaller ring (if a series of thresholds are used), when the vehicle continues to the pickup location, the predetermined distance may be reset to the first predetermined distance. This would essentially give the pedestrian, who may or may not be assigned to the vehicle, another chance to reach the vehicle. Of course, to avoid the vehicle constantly stopping, the predetermined distance may be reset only after the vehicle has reached at least a minimum distance from where it first stopped. For instance, this minimum distance may be 5 meters or more or less of forward progress by the vehicle after the vehicle stopped and/or identified a pedestrian within the first predetermined distance.

In some examples, prior to the vehicle authenticating the client device, a pedestrian may attempt to enter a slow moving vehicle, for instance, by pulling on a door handle of the vehicle. In response, the computing devices may simply come to a stop, and allow the pedestrian to enter the vehicle. Once in the vehicle, the computing devices may continue to attempt to authenticate the client device before proceeding to a destination or may alternatively, begin moving towards the destination and continue the authentication at the same time, in order to avoid remaining stopped in a roadway for too long a period of time. Similarly, if the authentication is not successful, before or once the vehicle is moving, a live help operator may be connected via speakers and/or video within the vehicle to communicate with the passenger and confirm his or her identity and desired destination. This may be especially useful where the client device has a low or dead battery and is unable to create a wireless link with the vehicle's computing devices.

If, once the vehicle has authenticated the client device and unlocked the doors, a pedestrian opens the door but does not actually get into the vehicle, but simply closes the door without entering, the computing devices may wait for the pedestrian to move some distance, such as a few feet or more or less away from the vehicle, and simply continue to the pickup location. To ensure that there is no one in the vehicle, in some cases, the computing devices may use feedback from internal sensors to determine whether there is a passenger in the vehicle. In addition or alternatively, a live operator may view live video and/or audio feeds to confirm whether a passenger is in the vehicle.

In addition to stopping the vehicle to wait for the passenger and unlocking one or more doors of the vehicle, the features described above may also (in addition or alternatively) be used to determine whether to open one or more doors of the vehicle to allow the pedestrian to enter. Of course, if the vehicle stops, the doors unlock automatically or open automatically, this may pose some risks of unauthorized persons getting into the vehicle. In this regard, this behavior may be limited to only certain situations such as where an assigned passenger's client computing device has been authenticated, location information generated by the client computing device (such as GPS location) or the vehicle's perception system (such as sensor data generated by one or more lidar, camera, radar, or other sensors) indicates that the pedestrian is within some short distance of the vehicle (such as 10 meters or more or less), the pedestrian has met some additional confirmation requirement (for instance, using facial recognition, gait detection, gaze detection, and/or trajectory confirmation as discussed above), and/or only during certain hours, such as daylight hours or a specific period of time such as 7 am to 6 pm, where the assigned passenger would be able to more easily identify an unauthorized person attempting to get into the vehicle. In addition, the vehicle may also be required to meet certain requirements, such as having come to a complete stop and the vehicle's transmission having been shifted to park, before opening the one or more doors.

In addition, all doors of the vehicle that a passenger could use to enter the vehicle may be opened or only certain doors. For instance, the computing devices may open a door of the vehicle that is closest to a curb or a location of one or more pedestrians that were identified as being within the predetermined distance of the vehicle.

Opening the one or more doors may even encourage passengers to sit in a particular row proximate to the open door. For instance, where there are multiple rows of seating, having an open door proximate to a particular row, for instance a middle row when there are three rows, may actually encourage passengers to use this particular row which may otherwise have been underutilized.

In addition, the doors may remain open until a passenger has closed the one or more doors, the passenger initiates a trip (for instance, by pressing a start ride button within the vehicle), or after a predetermined period of time has been reached. In the latter two scenarios, the computing devices 110 may automatically close the one or more doors upon the passenger initiating the trip or after the predetermined period of time has been reached, assuming a person is not detected within a doorway of the one or more doors.

In the examples above, the computing devices are able to determine that an assigned passenger is nearby the vehicle because of the authentication of the assigned passenger's client device and use this as one signal to initiate the logic described above. Alternatively, if authentication has not yet taken place, GPS or other location information provided to the computing devices, for instance by being sent from the client device to a server which relays the information to the client devices, may be used to determine that the assigned passenger is nearby the vehicle, and thus, this location information may be sufficient for the computing devices to initiate the logic.

As the computing devices are approaching the pickup location, they and/or a server computing device (which assigned the passenger and dispatched the vehicle), may send information to the client device in order to display various notifications to the passenger assigned to the vehicle. For instance, this may include notifications about when the vehicle will arrive, etc. However, once the computing devices have initiated the logic as discussed above, this information may or may not be sent to the client device, and some of the aforementioned notifications may not be displayed in order to reduce the likelihood of the passenger becoming distracted by the notifications while attempting to board early and making the process of early boarding more difficult. For example, it may still be useful to provide a notification that the doors of the vehicle are unlocked, once the vehicle is actually stopped, or in some cases, shortly before.

Figure 11:
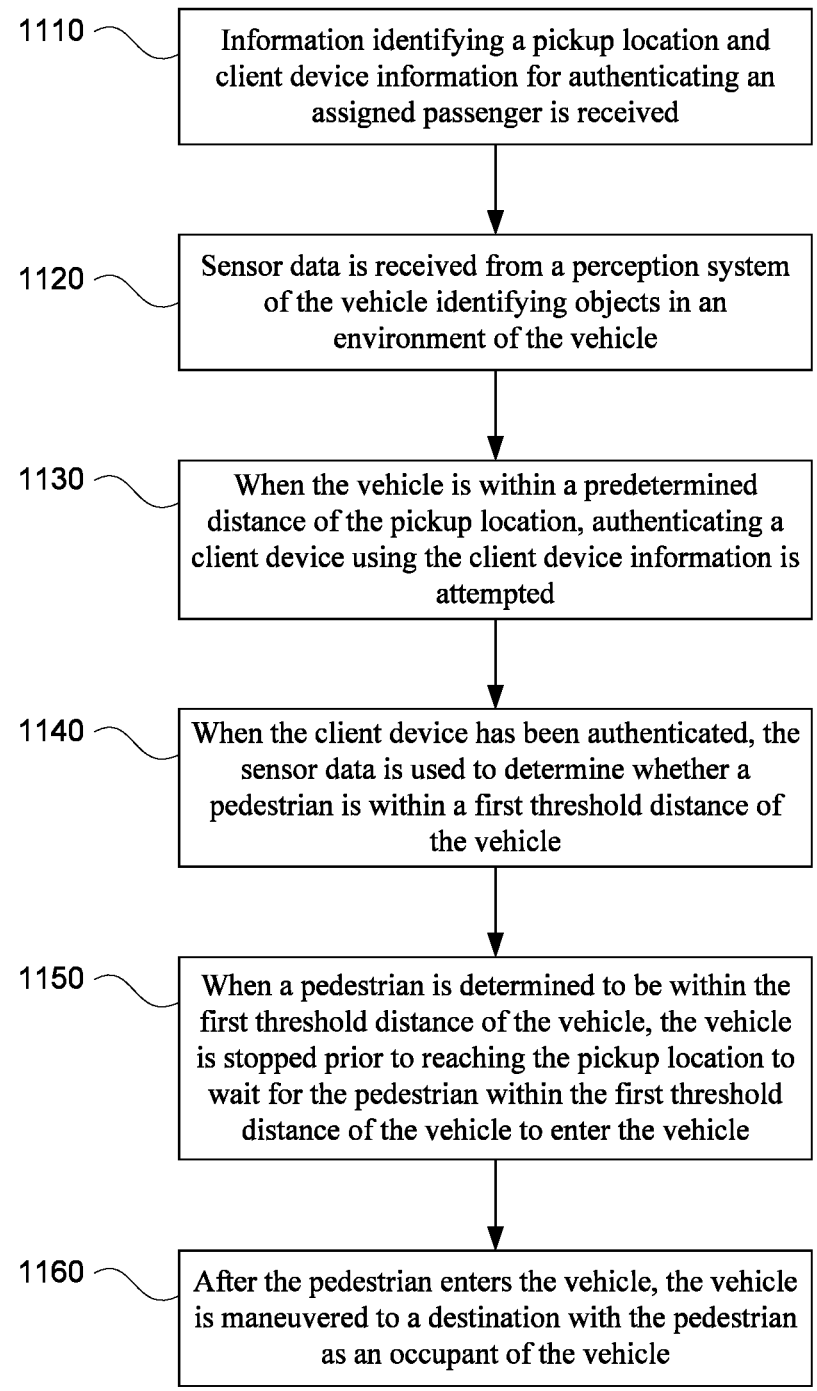
FIG. 11 is a flow diagram in accordance with aspects of the disclosure.

FIG. 11 is a flow diagram 1100 that may be performed by one or more processors such as one or more processors 120 of computing device 110 in order to actively look for an assigned passenger prior to a vehicle reaching a pickup location. In this example, at block 1110, information identifying the pickup location and client device information for authenticating the assigned passenger is received. At block 1120, sensor data is received from a perception system of the vehicle identifying objects in an environment of the vehicle. At block 1130, when the vehicle is within a predetermined distance of the pickup location, authenticating a client device using the client device information is attempted. At block 1140, when the client device has been authenticated, the sensor data is used to determine whether a pedestrian is within a first threshold distance of the vehicle. At block 1150, when a pedestrian is determined to be within the first threshold distance of the vehicle, the vehicle is stopped prior to reaching the pickup location to wait for the pedestrian within the first threshold distance of the vehicle to enter the vehicle. At block 1160, after the pedestrian enters the vehicle, the vehicle is maneuvered to a destination with the pedestrian as an occupant of the vehicle.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

INDUSTRIAL APPLICABILITY

The technology described herein enjoys wide industrial applicability, including, for instance, picking up passengers in vehicles that do not have a human driver.

The invention claimed is:

1. A method of actively looking for a passenger as a vehicle is approaching a pickup location, the method comprising:
maneuvering, by one or more processors, the vehicle in order to pick up an assigned passenger at a pickup location;
receiving, by the one or more processors, sensor data from a perception system of the vehicle identifying objects in an environment of the vehicle;
determining that a pedestrian is within a first area around the vehicle using the sensor data;
after determining that a pedestrian is within the first area, determining that a pedestrian is not within a second area around the vehicle, the second area being smaller than the first area;
when a pedestrian is determined not to be within the second area, determining whether a pedestrian is within a third area around the vehicle, the third area being larger than the second area; and
based on the determination of whether a pedestrian is determined to be within the third area, stopping, by the one or more processors, the vehicle prior to reaching the pickup location to wait for the pedestrian to enter the vehicle.

2. The method of claim 1, further comprising, determining the second area based on a dimension of the first area and an expected walking speed of a pedestrian.

3. The method of claim 2, wherein the dimension is a radial distance from the vehicle.

4. The method of claim 1, further comprising, determining the third area based on a dimension of the second area and an expected walking speed of a pedestrian.

5. The method of claim 4, wherein the dimension is a radial distance from the vehicle.

6. The method of claim 1, wherein the first area includes a first dimension and the third area includes a second dimension, and the first dimension is equal to the second dimension.

7. The method of claim 1, further comprising, in response to determining that the pedestrian is within the first area, initially stopping the vehicle to wait for the pedestrian to enter the vehicle.

8. The method of claim 7, further comprising, after initially stopping the vehicle to wait for the pedestrian to enter the vehicle and prior to determining that the passenger is within the third area, continuing to maneuver the vehicle in order to pick up the passenger at the pickup location.

9. The method of claim 8, wherein determining that the passenger is within the third area is performed only after the vehicle has reached at least a minimum distance from a location where the vehicle initially stopped to wait for a pedestrian to enter the vehicle.

10. The method of claim 1, wherein using the sensor data to determine whether a pedestrian is within the first area is performed only when the vehicle is traveling below a predetermined maximum speed limit.

11. The method of claim 1, wherein using the sensor data to determine that a pedestrian is within the first area is performed only when one or more requirements are met.

12. The method of claim 11, wherein the requirements include that the vehicle is in a particular lane of a roadway.

13. The method of claim 11, wherein the requirements include that the vehicle is traveling on a roadway that meets a particular maximum speed limit.

14. The method of claim 11, wherein the requirements include that a client computing device associated with the passenger has been authenticated.

15. The method of claim 11, wherein the requirements include that the vehicle is not currently within a no stopping or blocking zone.

16. The method of claim 11, wherein the requirements include that the vehicle is within a parking lot.

17. The method of claim 11, wherein the requirements include that the vehicle is not currently executing a particular maneuver.

18. The method of claim 17, wherein the particular maneuver is a pullover maneuver.

19. The method of claim 1, wherein stopping the vehicle includes stopping the vehicle in a current lane of the vehicle.

20. The method of claim 1, further comprising, controlling the vehicle to a destination with the pedestrian as a passenger of the vehicle.

\* \* \* \* \*